United States Patent
Pulford, Jr.

(10) Patent No.: US 6,756,705 B2
(45) Date of Patent: Jun. 29, 2004

(54) LINEAR STEPPER MOTOR

(75) Inventor: Robert Pulford, Jr., Wolcott, CT (US)

(73) Assignee: Tri-Tech., Inc, Waterbury, CT (US)

( * ) Notice: Subject to any disclaimer, the term of this patent is extended or adjusted under 35 U.S.C. 154(b) by 22 days.

(21) Appl. No.: 09/783,179

(22) Filed: Feb. 12, 2001

(65) Prior Publication Data

US 2001/0033110 A1 Oct. 25, 2001

Related U.S. Application Data

(60) Provisional application No. 60/220,369, filed on Jul. 24, 2000, and provisional application No. 60/181,449, filed on Feb. 10, 2000.

(51) Int. Cl.[7] .......................... H02K 5/167; H02K 41/00
(52) U.S. Cl. ............................................. 310/12; 384/29
(58) Field of Search ................................ 148/103, 105, 148/108; 318/135; 29/596, 598; 384/625, 29; 310/12, 13, 14

(56) References Cited

U.S. PATENT DOCUMENTS

| | | | | |
|---|---|---|---|---|
| 3,620,133 A | * | 11/1971 | Feucht | 92/33 |
| 3,828,211 A | * | 8/1974 | Laronze | 310/13 |
| 3,867,676 A | | 2/1975 | Chai et al. | 318/135 |
| 4,166,284 A | * | 8/1979 | Daniels | 360/266.5 |
| 4,198,582 A | | 4/1980 | Matthias et al. | 310/12 |
| 4,286,180 A | * | 8/1981 | Langley | 310/12 |
| 4,408,138 A | | 10/1983 | Okamoto | 310/12 |
| 4,504,750 A | * | 3/1985 | Onodera et al. | 310/12 |
| 4,575,652 A | * | 3/1986 | Gogue | 310/49 R |
| 4,607,197 A | | 8/1986 | Conrad | 318/115 |
| 4,622,609 A | | 11/1986 | Barton | 360/266.6 |
| 4,695,777 A | | 9/1987 | Asano | 318/135 |
| 4,712,027 A | | 12/1987 | Karidis | 310/12 |
| 4,810,914 A | | 3/1989 | Karidis et al. | 310/12 |
| 5,284,411 A | * | 2/1994 | Enomoto et al. | 414/217 |
| 5,659,280 A | * | 8/1997 | Lee et al. | 335/284 |
| 5,796,186 A | * | 8/1998 | Nanba et al. | 310/14 |
| 5,949,161 A | * | 9/1999 | Nanba | 310/12 |
| 5,955,798 A | * | 9/1999 | Ishiyama et al. | 310/12 |
| 6,016,021 A | | 1/2000 | Hinds | 310/12 |

* cited by examiner

Primary Examiner—Thanh Lam
Assistant Examiner—Judson H. Jones
(74) Attorney, Agent, or Firm—John H. Crozier

(57) ABSTRACT

In a preferred embodiment, linear stepper motor, comprising; an annular stator structure; an axially extending, cylindrical, permanent magnet shaft extending coaxially through said annular stator structure; and the axially extending, cylindrical, permanent magnet shaft having a smooth external surface along a portion thereof with axially alternating N and S poles defined circumferentially in an outer periphery of the portion of the axially extending, cylindrical, permanent magnet shaft. The present invention also provides a method of magnetizing the shaft of such a motor and a fixture and method of manufacturing the fixture therefor.

19 Claims, 3 Drawing Sheets

LINEAR STEPPER MOTOR

CROSS-REFERENCE TO RELATED APPLICATION

The present application claims the benefit of the filing dates of U.S. Provisional Application No. 60/181,449, filed Feb. 10, 2000, and titled LINEAR STEPPER MOTOR and No. 60/220,369, filed Jul. 24, 2000, and titled METHOD AND FIXTURE FOR MANUFACTURE OF A LINEAR STEPPER MOTOR SHAFT.

BACKGROUND OF THE INVENTION

1. Field of the Invention

The present invention relates to stepper motors generally and, more particularly, but not by way of limitation, to a novel linear stepper motor, a fixture for the magnetization of the shaft thereof, and methods of use and manufacture.

2. Background Art

Some linear stepper motors convert rotary motion to linear motion by mechanical means such as through the use of a threaded nut and lead screw. Conventional linear motors that directly transfer electromagnetic energy in the stator poles to linear movement of a shaft typically employ toothed structures or have relatively complicated slide/stator arrangements. In either case, the manufacture of such motors is relatively expensive and the motors typically have high parts counts.

A problem resides in producing a linear motor with a smooth shaft with alternating N and S poles. One technique is to glue together cylindrical segments of N and S magnets. That technique, however, is time consuming and results in a somewhat weak structure. Another technique is to roll a cylinder of ferromagnetic material over a flat plate orthogonal to a series of alternating N and S magnetic strips. This technique is somewhat clumsy and suffers from the fact that the resulting magnetized shaft is of fairly weak magnetic strength.

Some conventional motors are described in the following patent documents:

U.S. Pat. No. 3,867,676, issued Feb. 18, 1975, to Chai et al., and titled VARIABLE RELUCTANCE LINEAR STEPPER MOTOR, describes such a motor that has toothed structures on the coils and on the linear member. The novelty of the patent appears to reside in the arrangement of the coils and the manner in which they are energized.

U.S. Pat. No. 4,198,582, issued Apr. 15, 1980, to Matthias et al., and titled HIGH PERFORMANCE STEPPER MOTOR, describes, in part, a variable reluctance linear stepper motor in which both the stator and the slider have nonmagnetic materials arranged therein such that flux leakage is reduced.

U.S. Pat. No. 4,286,180, issued Aug. 25, 1981, to Langley, and titled VARIABLE RELUCTANCE STEPPER MOTOR, describes, in part, such a motor having helically toothed stator and slide structures, the respective widths of the teeth having a predetermined relationship.

U.S. Pat. No. 4,408,138, issued Oct. 4, 1983, to Okamoto, and titled LINEAR STEPPER MOTOR, describes a linear stepper motor having toothed structures on the stator and on the slider. Coil-wound salient poles are provided on the slider. The novelty of the patent appears to reside in the arrangement of rollers and rails disposed between the stator and the slider U.S. Pat. No. 4,607,197, issued Aug. 19, 1986, to Conrad, and titled LINEAR AND ROTARY ACTUATOR, describes a variable reluctance linear/rotary motor in which the armature has axial rows of teeth radially spaced around the surface thereof. Selective energization of stator windings provides linear, rotary, or both linear and rotary motion of the armature.

U.S. Pat. No. 4,622,609, issued Nov. 11, 1986, to Barton, and titled READ/WRITE HEAD POSITIONING APPARATUS, describes a variable reluctance positioning device having toothed structures on facing surfaces of the stator and the armature and with coils placed on the armature.

U.S. Pat. No. 4,695,777, issued Sep. 22, 1987, to Asano, and titled VR TYPE LINEAR STEPPER MOTOR, describes such a motor having toothed structures on the stator and on the slider, the toothed structures on the stator being on coil-wound salient poles. The toothed structures bear a predetermined relationship therebetween.

U.S. Pat. No. 4,712,027, issued Dec. 8, 1987, to Karidis, and titled RADIAL POLE LINEAR RELUCTANCE MOTOR, describes such a motor having a smooth double-helix stator shaft and a smooth laminated armature of alternate radial pole laminations and spacer laminations. This arrangement permits a balanced flux path and uses the stator and armature surfaces as slider bearing surfaces.

U.S. Pat. No. 4,810,914, issued Mar. 7, 1989, to Karidis et al., and titled LINEAR ACTUATOR WITH MULTIPLE CLOSED LOOP FLUX PATHS ESSENTIALLY ORTHOGONAL TO ITS AXIS, describes a variable reluctance actuator similar in pertinent respects to that described in the '027 patent above.

U.S. Pat. No. 6,016,021, issued Jan. 18, 2000, to Hinds, and titled LINEAR STEPPER MOTOR, describes a variable reluctance stepper motor similar in pertinent respects to the motor described in the '609 patent above. The novelty of the patent appears to reside in the method of forming the teeth Accordingly, it is a principal object of the present invention to provide a permanent magnet shaft for a linear stepper motor that has a smooth, external peripheral surface.

It is a further object of the invention to provide a linear stepper motor that has low parts counts and is simple and economical to manufacture.

It is an additional object of the invention to provide a method of magnetizing a smooth shaft for a linear stepper motor that is quick and economical.

It is another object of the invention to provide a fixture for magnetizing a smooth shaft for a linear stepper motor.

It is yet a further object of the invention to provide a fixture for magnetizing a smooth shaft for a linear stepper motor that can be economically manufactured.

It is yet an additional object of the invention to provide such a stepper motor conventional coils each easily wound around a bobbin.

It is yet another object of the invention to provide such a stepper motor having a shaft that can rotate at any position at any time, whether or not the motor is on or off or the shaft is moving linearly.

Other objects of the present invention, as well as particular features, elements, and advantages thereof, will be elucidated in, or be apparent from, the following description and the accompanying drawing figures.

SUMMARY OF THE INVENTION

The present invention achieves the above objects, among others, by providing, in a preferred embodiment, linear stepper motor, comprising; an annular stator structure; an axially extending, cylindrical, permanent magnet shaft extending coaxially through said annular stator structure; and said axially extending, cylindrical, permanent magnet shaft having a smooth external surface along a portion thereof with axially alternating N and S poles defined circumferentially in an outer periphery of said portion of said axially extending, cylindrical, permanent magnet shaft. The present invention also provides a method of magnetizing the shaft of such a motor and a fixture and method of manufacturing the fixture therefor.

BRIEF DESCRIPTION OF THE DRAWING

Understanding of the present invention and the various aspects thereof will be facilitated by reference to the accompanying drawing figures, provided for purposes of illustration only and not intended to define the scope of the invention, on which.

DETAILED DESCRIPTION OF THE PREFERRED EMBODIMENTS

Figure 1:
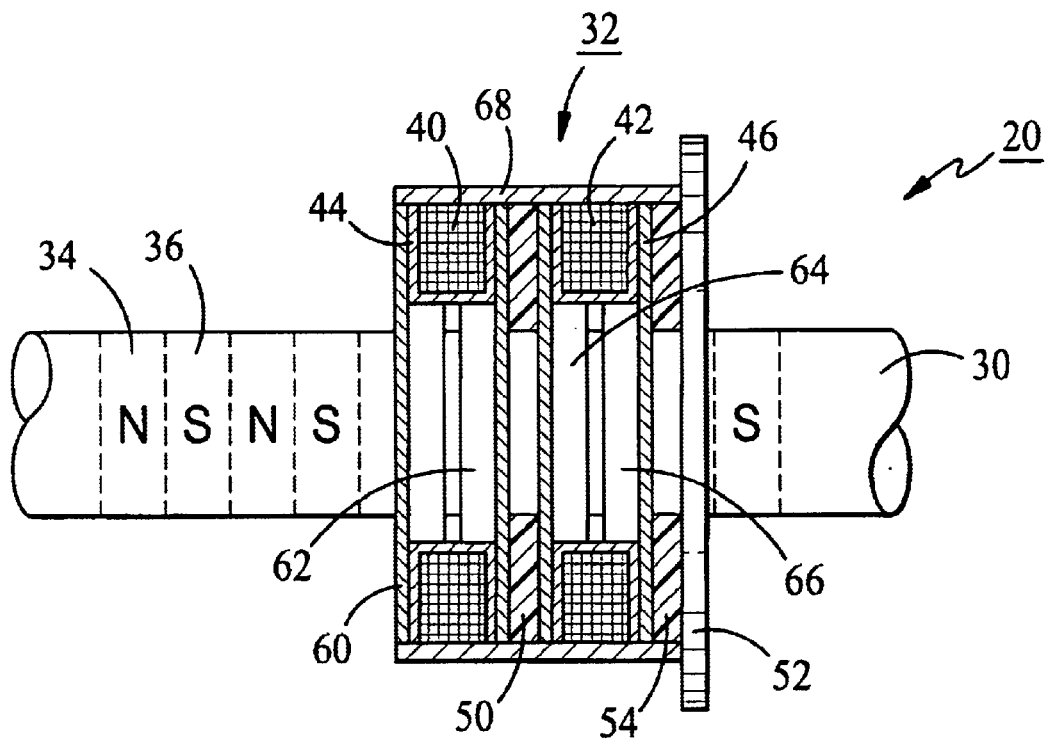
FIG. 1 is a fragmentary, side elevational view, partially in cross-section, of a linear stepper motor constructed according to the present invention.

Reference should now be made to the drawing figures on which similar or identical elements are given consistent identifying numerals throughout the various figures thereof, and on which parenthetical references to figure numbers direct the reader to the view(s) on which the element(s) being described is (are) best seen, although the element(s) may be seen on other figures also.

FIG. 1 illustrates a linear stepper motor, constructed according to the present invention, and generally indicated by the reference numeral 20. Motor 20 includes a shaft, or slider, 30 having a smooth outer peripheral surface (at least the portion thereof illustrated) and inserted in a stator structure, generally indicated by the reference numeral 32, for axial back and forth motion of the shaft with respect to the stator structure.

Shaft 30 includes a plurality of alternating N and S nonsalient poles, as at 34 and 36, respectively, formed around the periphery thereof, which poles may be formed as described below. Shaft 30 is preferably a hollow cylinder of ceramic or rare earth magnetic material, although the shaft may be solid or may have a core of ferromagnetic or other material with a hollow cylinder of the magnetic material disposed around the core. Shaft 30 can be economically constructed, for example, by conventional extrusion techniques that can produce a shaft of any given length or the shaft can be cut to a suitable length from extruded stock. At least the portion of shaft 30 containing the N and S poles is non-segmented and is constructed of a single piece of material.

Stator structure 52 includes first and second, cylindrical, coils 40 and 42, respectively, encircling shaft 30, and conventionally wound on first and second annular bobbins 44 and 46. Bobbins 44 and 46 are formed of an electrically insulating material such as Delrin®. First and second bobbins 44 and 46 are spaced apart by a first spacer 50 and the second bobbin may be spaced apart from an end plate 52 of motor 20 by a second spacer 54. First and second spacers 50 and 54 may also provide bearing surfaces for shaft 30, in which case the first and second spacers are preferably of a material having a high degree of lubricity such as Delrin®.

First bobbin 44 spaces apart annular pole plates 60 and 62, while second bobbin 46 spaces apart annular pole plates 64 and 66. A steel band 68 surrounds and is in good electrical contact with annular pole plates 60, 62, 64, and 66, thus completing the circular electromagnetic circuit. Annular pole plates 60, 62, 64, and 66 have nonsalient poles It will be understood that, by suitable energization of first and second coil-wound bobbins in a conventional manner, shaft 30 may be made to incrementally "step" to the left or right on FIG. 1. It will be further understood that one or both ends of shaft 30 may be attached to, or bear against, one or more elements of another device (not shown).

While motor 20 is shown as having one set of two-phase stator sections, that is, the motor has two coils, it will be understood that other arrangements are possible as well. For example, two or more sets of two-phase stator sections may be provided for greater power, the additional sets of stator sections being added serially in a modular manner.

Figure 2:
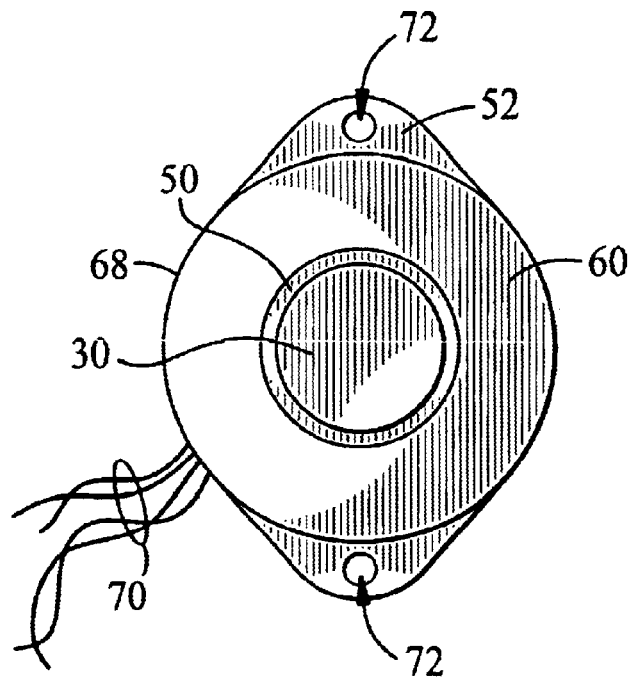
FIG. 2 is a rear elevational view of the motor of FIG. 1.

FIG. 2 illustrates some of the elements of motor 20 (FIG. 1) and illustrates conductors 70 that are used to energize stator structure 32 and mounting holes 72 defined in end plate 52.

Thus arranged, motor 20 as shown (FIG. 1) in its minimum configuration is constructed of only 11 individual elements that may be held together principally with a suitable adhesive or other conventional means may be provided to secure together the elements of motor 20.

Figure 3:
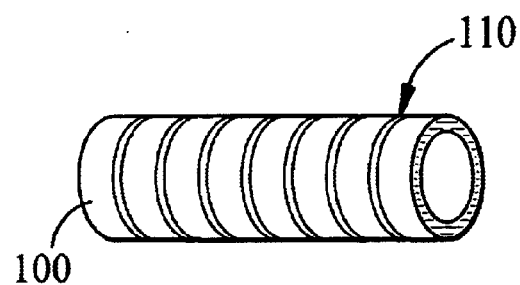
FIG. 3 is an isometric view of a grooved mandrel for use in fabricating a fixture for magnetizing the shaft of the motor of FIG. 1.

FIG. 3 illustrates a mandrel 100 that can be used in constructing a fixture for use in magnetizing shaft 30 (FIG. 1). Here a cylindrical mandrel 100 has a plurality of parallel, cylindrical grooves, as at 110, cut in the outer periphery thereof, the groove having a width approximating the diameter of a wire conductor to be used in magnetizing shaft 30. Mandrel 100 is constructed of a non-magnetic, non-electrically-conducting material, with the spacing of grooves 110 being determined by the final magnetic widths of poles 34 and 36 on shaft 30.

Figure 4:
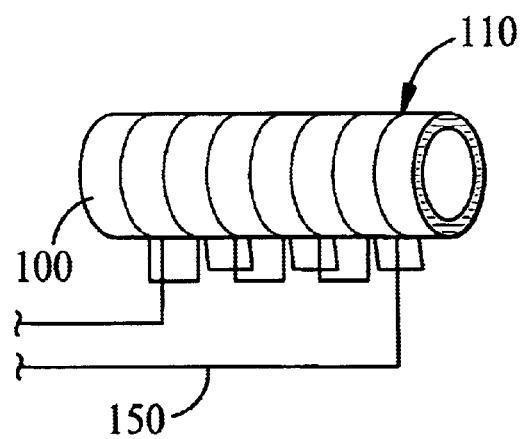
FIG. 4 is an isometric view of the mandrel of FIG. 3 with a conductive wire inserted in the grooves of the mandrel.

FIG. 4 illustrates a conductive wire 150 serially disposed in grooves 110 in mandrel 100.

Figure 5:
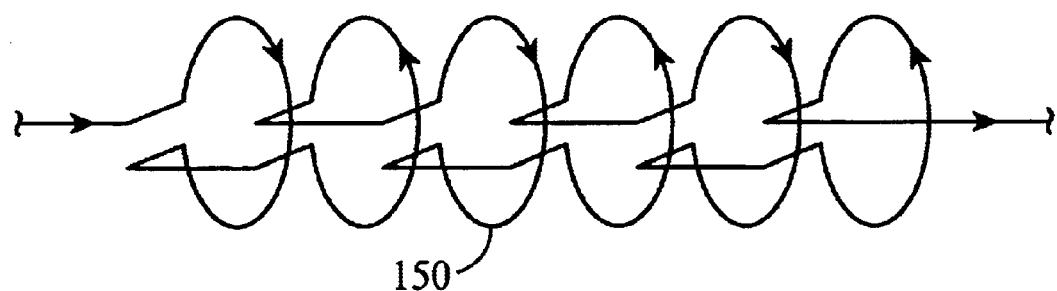
FIG. 5 is an schematic, isometric view of the conductive wire showing the path of a direct current flowing therein.

FIG. 5 illustrates the current path in conductive wire 150, each nearly complete circle shown on FIG. 5 representing a turn of conductive wire 150 in one of grooves 110. It will be noticed that the current flow represented by the arrows in conductive wire 150 in adjacent turns of the conductive wire are in opposite directions.

Figure 6:
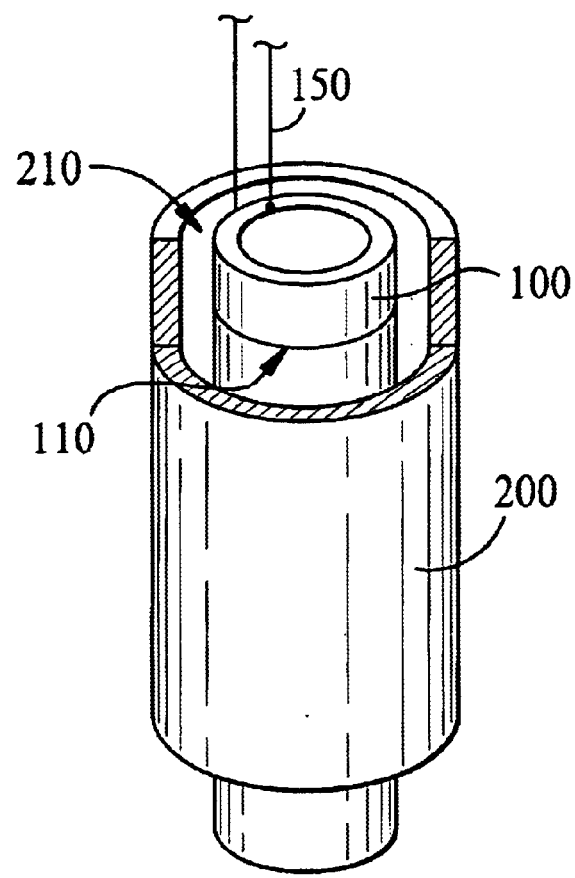
FIG. 6 is an isometric view, partially cut-away, showing the mandrel of FIG. 3 inserted in a potting fixture.

FIG. 6 illustrates mandrel 100, with conductive wire 150 placed in grooves 110, disposed in a cylindrical, hollow potting fixture 200. In this step, a suitable potting compound, such as an epoxy material, is poured into an annulus 210 defined between the outer surface of mandrel 100 and the inner surface of potting fixture 200. After hardening, the potting compound holds conductive wire 150 in place in grooves 110.

Figure 7:
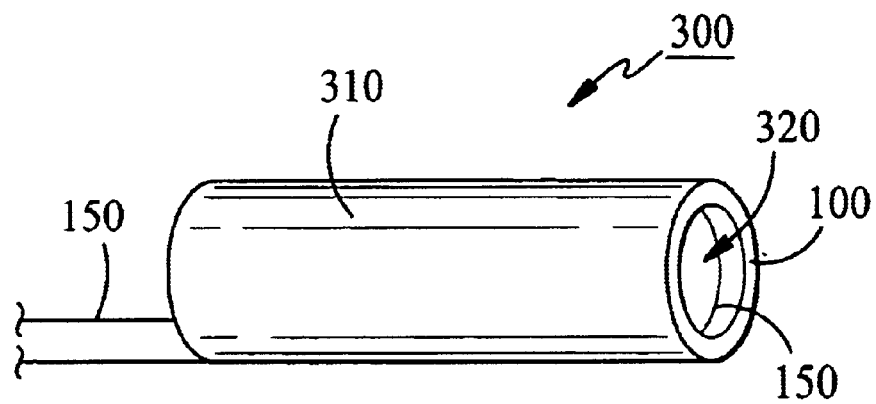
FIG. 7 is an isometric view showing a magnetizing fixture according to the present invention.

FIG. 7 illustrates a finished magnetizing fixture, generally indicated by the reference numeral 300. Fixture 300 comprises mandrel 100 with an outer coating of potting compound 310 and ends of conductive wire 150 extending therefrom. A central axial bore 320 has been created, or enlarged, through mandrel 100 to bring conductive wire 150 near to the inner surface of the mandrel or even to be partially exposed, as shown on FIG. 7, if desired.

Shaft 30 of motor 20 (FIG. 1) can now be inserted into fixture 300 and a high level of direct current passed through conductive wire 150 to magnetize alternating N and S poles 34 and 36 along a selected length thereof. Such an arrangement provides an economical and rapid method of magnetizing shaft 30 and nearly any strength of magnetization can be provided, depending on the magnet material, since only one quick burst of direct current is necessary and that can be in a wide range of voltages.

Motor 20 (FIG. 1) has a number of important features. For example, motor 20 is of a brushless, magnetically coupled, bi-directional, non-arcing design, having long operational life, with permanently magnetized output shaft 30. Motor 20 runs on conventional stepper motor drives and can be microstepped for increased resolution and accuracy. Shaft 30 is the only moving part and it can be rotated 360° continuously or intermittently in either direction, at any time and at any linear position, including when motor 20 is not energized. There is no conversion of rotary motion to linear motion with the concomitant efficiency losses. There are no lead screws, ball screws, or ball bearings to wear out and no lubrication is required. Motor 20 can operate in any orientation and is back-driveable (especially at low or zero power input), that is, shaft 30 can be moved by overcoming the magnetic force between the shaft and annular pole plates 64 and 66. Performance of motor 20 can be increased with shorter duty cycles and can be easily constructed for vacuum environments, that is, it can be constructed of materials that do not out gas in a vacuum, the lack of lubrication contributing to this feature. Shaft 30 when hollow allows the pass-through of electrical, optical, and/or fluid lines, and/or the like.

In the embodiments of the present invention described above, it will be recognized that individual elements and/or features thereof are not necessarily limited to a particular embodiment but, where applicable, are interchangeable and can be used in any selected embodiment even though such may not be specifically shown.

Terms such as "upper", "lower", "inner", "outer", "inwardly", "outwardly", "vertical", "horizontal", and the like, when used herein, refer to the positions of the respective elements shown on the accompanying drawing figures and the present invention is not necessarily limited to such positions.

It will thus be seen that the objects set forth above, among those elucidated in, or made apparent from, the preceding description, are efficiently attained and, since certain changes may be made in the above construction without departing from the scope of the invention, it is intended that all matter contained in the above description or shown on the accompanying drawing figures shall be interpreted as illustrative only and not in a limiting sense.

It is also to be understood that the following claims are intended to cover all of the generic and specific features of the invention herein described and all statements of the scope of the invention which, as a matter of language, might be said to fall therebetween.

The embodiments of the invention in which an exclusive property or privilege is claimed are defined as follows:

1. A linear stepper motor, comprising:

(a) an annular stator structure;

(b) an axially extending, cylindrical, permanent magnet shaft extending coaxially through said annular stator structure;

(c) said axially extending, cylindrical, permanent magnet shaft having a smooth external surface along a portion thereof with axially alternating N and S poles defined circumferentially in an outer periphery of said portion of said axially extending, cylindrical, smooth, permanent magnet shaft;

(d) said portion of said axially extending, cylindrical, permanent magnet shaft has a solid core;

(e) said solid core is formed from a non-magnetic material; and (f) said stator structure includes annular disks of a high lubricity material spacing apart elements of said stator structure and serving as bearing surfaces for said axially extending shaft.

2. A linear stepper motor, as defined in claim 1, wherein: said axially extending, cylindrical, smooth, permanent magnet shaft can rotate 360° continuously or intermittently in any direction, regardless of whether or not said linear stepper motor is energized.

3. A linear stepper motor, as defined in claim 1, wherein: said axially extending, cylindrical, smooth, permanent magnet shaft is back-driveable.

4. A linear stepper motor, as defined in claim 1, wherein: said linear stepper motor is constructed to operate in any orientation.

5. A linear stepper motor, as defined in claim 1, wherein: said stator structure has modular stator stacks with pole pieces to concentrate and direct magnetic flux.

6. A linear stepper motor as defined in claim 1, wherein: said stator structure has conventionally wound coils.

7. A linear stepper motor, as defined in claim 1, wherein: said linear stepper motor includes no lead screw and no ball screw.

8. A linear stepper motor, as defined in claim 1, wherein: said linear stepper motor requires no lubrication of coengaged parts thereof.

9. A linear stepper motor, as defined in claim 1, wherein: said linear stepper motor requires no conversion of rotary motion to linear motion.

10. A linear stepper motor, comprising;

(a) an annular stator structure;

(b) an axially extending, cylindrical, permanent magnet shaft extending coaxially through said annular stator structure;

(c) said axially extending, cylindrical, permanent magnet shaft having a smooth external surface along a portion thereof with axially alternating N and S poles defined circumferentially in an outer periphery of said portion of said axially extending, cylindrical, smooth, permanent magnet shaft; and (d) said stator structure includes annular disks of a high lubricity material spacing apart elements of said stator structure and serving as bearing surfaces for said axially extending shaft.

11. A linear stepper motor, as defined in claim 10, wherein: said portion of said axially extending, cylindrical, permanent magnet shaft is hollow.

12. A linear stepper motor, as defined in claim 10, wherein: said axially extending, cylindrical, smooth, permanent magnet shaft can rotate 360° continuously or intermittently in any direction, regardless of whether or not said linear stepper motor is energized.

13. A linear stepper motor, as defined in claim 10, wherein: said axially extending, cylindrical, smooth, permanent magnet shaft is back-driveable.

14. A linear stepper motor, as defined in claim 10, wherein: said linear stepper motor is constructed to operate in any orientation.

15. A linear stepper motor, as defined in claim 10, wherein: said stator structure has modular stator stacks with pole pieces to concentrate and direct magnetic flux.

16. A linear stepper motor as defined in claim 10, wherein: said stator structure has conventionally wound coils.

17. A linear stepper motor, as defined in claim 10, wherein: said linear stepper motor includes no lead screw and no ball screw.

18. A linear stepper motor, as defined in claim 10, wherein: said linear stepper motor requires no lubrication of coengaged parts thereof.

19. A linear stepper motor, as defined in claim 10, wherein: said linear stepper motor requires no conversion of rotary motion to linear motion.

* * * * *